(12) United States Patent
Shaw et al.

(10) Patent No.: US 11,821,242 B2
(45) Date of Patent: Nov. 21, 2023

(54) FUEL/CHARGE PORT DOOR ASSEMBLY OVERRIDE SYSTEMS AND METHODS

(71) Applicant: FORD GLOBAL TECHNOLOGIES, LLC, Dearborn, MI (US)

(72) Inventors: Scott Shaw, Plymouth, MI (US); William Barrett, Grosse Pointe Woods, MI (US); William Ethan-Alexander McClure, Clawson, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 111 days.

(21) Appl. No.: 17/193,304

(22) Filed: Mar. 5, 2021

(65) Prior Publication Data
US 2022/0282531 A1   Sep. 8, 2022

(51) Int. Cl.
*E05B 81/90* (2014.01)
*E05B 83/34* (2014.01)

(52) U.S. Cl.
CPC .............. *E05B 81/90* (2013.01); *E05B 83/34* (2013.01); *E05Y 2201/624* (2013.01); *E05Y 2201/66* (2013.01); *E05Y 2600/63* (2013.01); *E05Y 2800/11* (2013.01); *E05Y 2800/46* (2013.01); *E05Y 2900/534* (2013.01)

(58) Field of Classification Search
CPC ............ B60K 15/05; B60K 2015/0515; B60K 2015/0561; B60K 2015/0576; B60K 15/0409; E05B 83/34; E05B 81/90; E05B 63/0052; E05B 63/22; E05B 63/24; E05B 17/0054; E05B 17/0058; E05Y 2900/534; E05C 17/52; E05C 19/06; E05C 19/063; E05C 19/66; E05C 19/02
See application file for complete search history.

(56) References Cited

U.S. PATENT DOCUMENTS 2,208,486 A * 7/1940 Aldeen ................. E05C 19/063
  292/76
2,833,583 A * 5/1958 Stone .................... E05C 19/026
  292/18

(Continued)

FOREIGN PATENT DOCUMENTS

JP  2007153155 A  *  6/2007
KR     0173753 B1     2/1999
KR  20050047830 A     5/2005

OTHER PUBLICATIONS

Merriam-Webster.com Dictionary, s.v. "lobe," accessed May 23, 2023, https://www.merriam-webster.com/dictionary/lobe. (Year: 2024).*

(Continued)

*Primary Examiner* — Kristina R Fulton
*Assistant Examiner* — Emily G. Brown
(74) *Attorney, Agent, or Firm* — Vichit Chea; Carlson, Gaskey & Olds, P.C.

(57) ABSTRACT

Vehicle assemblies are provided that include movable door assemblies. Examples of vehicle assemblies with movable door assemblies include charge port housing assemblies and fuel fill housing assemblies. An exemplary vehicle assembly may include an override retainer. The override retainer may include a flexible flap or clip that is configured to deflect or otherwise distort to release a latching assembly from the door assembly when a manual override force is applied to the door assembly.

17 Claims, 7 Drawing Sheets

(56) References Cited

U.S. PATENT DOCUMENTS

| | | | | |
|---|---|---|---|---|
| 4,272,111 | A * | 6/1981 | Hammer, Jr. | E05B 65/104 292/17 |
| 5,292,158 | A * | 3/1994 | Kurosaki | G11B 33/04 292/45 |
| 6,318,771 | B1 | 11/2001 | Holloway et al. | |
| 6,497,835 | B1 * | 12/2002 | Mittelhauser | B29C 45/16 264/328.8 |
| 7,781,025 | B2 | 8/2010 | Sufczynski et al. | |
| 2011/0115239 | A1 * | 5/2011 | Imatomi | B60K 15/05 292/143 |
| 2011/0241360 | A1 * | 10/2011 | Kitamura | E05B 81/90 292/201 |
| 2012/0242095 | A1 * | 9/2012 | Niwa | E05B 81/18 292/142 |
| 2014/0183898 | A1 * | 7/2014 | Betzen | B62D 25/24 296/97.22 |
| 2017/0182882 | A1 * | 6/2017 | Persiani | B60K 15/05 |
| 2019/0248232 | A1 * | 8/2019 | Stack | B60K 15/05 |
| 2020/0055389 | A1 * | 2/2020 | Herzig | E05D 3/125 |
| 2020/0346541 | A1 | 11/2020 | Glickman et al. | |
| 2021/0095501 | A1 * | 4/2021 | Eberle | B60K 15/05 |
| 2021/0246695 | A1 * | 8/2021 | Kuwayama | E05C 19/02 |
| 2021/0372172 | A1 * | 12/2021 | Tanaka | E05C 19/022 |
| 2022/0144079 | A1 * | 5/2022 | Smith | B60K 15/05 |

OTHER PUBLICATIONS

Merriam-Webster.com Dictionary, s.v. "deflect," accessed May 24, 2023, https://www.merriam-webster.com/dictionary/deflect. (Year: 2024).*

Espacenet, Machine translation of JP 2007153155A, generated Dec. 19, 2022 (Year: 2022).*

* cited by examiner

FUEL/CHARGE PORT DOOR ASSEMBLY OVERRIDE SYSTEMS AND METHODS

TECHNICAL FIELD

This disclosure relates to vehicle assemblies that include movable door assemblies, and more particularly to vehicle charge port/fuel fill housing assemblies that include override retainers configured for allowing the manual release of a door assembly.

BACKGROUND

Motor vehicles are known to include fuel and/or charging port doors that are configured to rotate between open and closed positions to selectively expose and cover a fuel inlet conduit or charging port. Some doors are lockable in the closed position. For example, plug-in hybrid electric vehicles (PHEVs) sometimes lock the fuel door while the fuel is pressurized.

SUMMARY

A vehicle assembly according to an exemplary aspect of the present disclosure includes, among other things, a door assembly configured to move between a closed position and an open position, a latching assembly configured to selectively lock the door assembly in the closed position, and an override retainer configured to deflect to release the latching assembly from the door assembly when a manual override force is applied to the door assembly.

In a further non-limiting embodiment of the foregoing vehicle assembly, the door assembly includes a fuel door or a charge port door.

In a further non-limiting embodiment of either of the foregoing vehicle assemblies, the manual override force is applied to the door assembly by a tool in response to a malfunction of the latching assembly.

In a further non-limiting embodiment of any of the foregoing vehicle assemblies, the override retainer includes a central ring and a pair of flexible retaining flaps that extend outwardly from the central ring.

In a further non-limiting embodiment of any of the foregoing vehicle assemblies, the central ring is received about a barrel of the latching assembly, and the flexible retaining flaps engage surfaces of a hinge arm of the door assembly that are located adjacent to the latching assembly.

In a further non-limiting embodiment of any of the foregoing vehicle assemblies, the pair of flexible retaining flaps are configured to deflect to release the latching assembly from the door assembly when the manual override force is applied.

In a further non-limiting embodiment of any of the foregoing vehicle assemblies, the override retainer includes a first retainer clip located adjacent to a first side of the latching assembly and a second retainer clip located adjacent to a second side of the latching assembly.

In a further non-limiting embodiment of any of the foregoing vehicle assemblies, each of the first retainer clip and the second retainer clip includes an attachment portion, a deflection portion, a re-engagement portion, a shelf portion, and a free end portion.

In a further non-limiting embodiment of any of the foregoing vehicle assemblies, the attachment portion is secured to a surface of a hinge arm of the door assembly, and the shelf portion is configured to engage a T-bar of the latching assembly.

In a further non-limiting embodiment of any of the foregoing vehicle assemblies, a deflection point of the deflection portion deflects when the manual override force is applied. The deflection of the deflection point displaces the shelf portion in a direction away from the T-Bar to release the latching assembly from the door assembly.

In a further non-limiting embodiment of any of the foregoing vehicle assemblies, the latching assembly includes a T-bar movable between a first position and a second position that is transverse to the first position.

In a further non-limiting embodiment of any of the foregoing vehicle assemblies, the vehicle assembly is part of a vehicle that includes a vehicle body component. The door assembly is movable relative to the vehicle body component when moved between the closed position and the open position.

In a further non-limiting embodiment of any of the foregoing vehicle assemblies, the vehicle body component is a quarter panel or a fender.

A method according to another exemplary aspect of the present disclosure includes, among other things, deflecting an override retainer to release a latching assembly from a door assembly of a vehicle charge port housing assembly or a vehicle fuel fill housing assembly during a manual override event in which a manual override force is applied to the door assembly.

In a further non-limiting embodiment of the foregoing method, the override retainer is integrally molded together with a hinge arm of the door assembly.

In a further non-limiting embodiment of either of the foregoing methods, the override retainer is molded together with the hinge arm as part of a two-shot injection molding process.

In a further non-limiting embodiment of any of the foregoing methods, deflecting the override retainer includes allowing a T-bar of the latching assembly to be displaced from the override retainer.

In a further non-limiting embodiment of any of the foregoing methods, deflecting the override retainer includes distorting a flexible retaining flap of the override retainer.

In a further non-limiting embodiment of any of the foregoing methods, deflecting the override retainer includes distorting a flexible clip of the override retainer.

In a further non-limiting embodiment of any of the foregoing methods, the override retainer is configured to allow a portion of the latching assembly to pass back through the override retainer when the door assembly is closed subsequent to the manual override event, thereby reengaging the override retainer and thus the door assembly relative to the latching assembly.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure is directed to vehicle assemblies that include movable door assemblies. Examples of vehicle assemblies with movable door assemblies include charge port housing assemblies and fuel fill housing assemblies. An exemplary vehicle assembly may include an override retainer. The override retainer may include a flexible flap or clip that is configured to deflect or otherwise distort to release a latching assembly from the door assembly when a manual override force is applied to the door assembly. These and other features of this disclosure are described in greater detail below.

Figure 1:
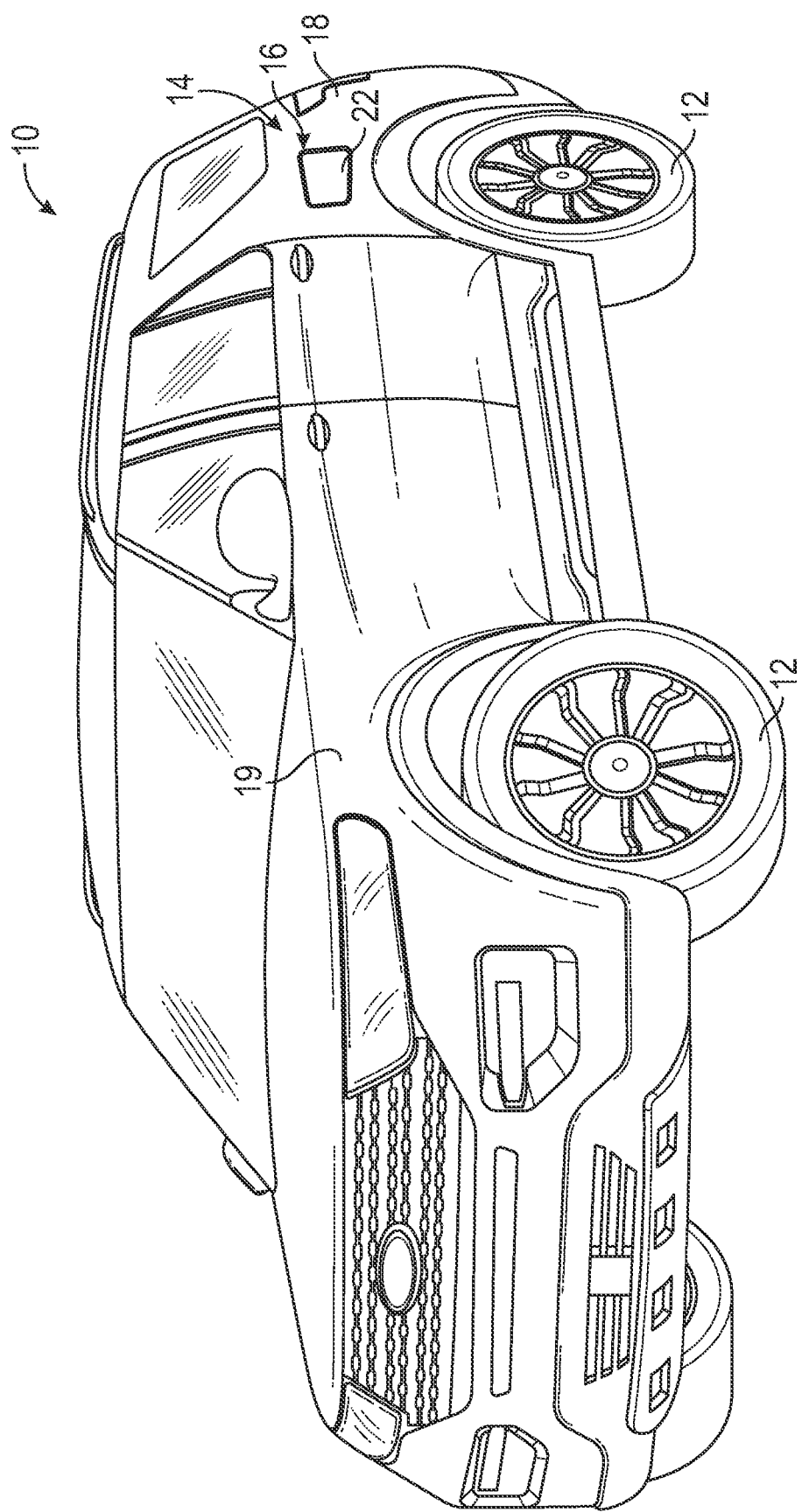
FIG. 1 illustrates a vehicle equipped with a charge port housing assembly.

FIG. 1 illustrates an exemplary motor vehicle 10. In an embodiment, the vehicle 10 is an electrified vehicle that includes an electrified powertrain capable of applying a torque from an electric machine for driving drive wheels 12 of the vehicle 10. The vehicle 10 may be a plug-in hybrid electric vehicle (PHEV) or a battery electric vehicle (BEV), for example. Therefore, the powertrain may electrically propel the drive wheels 12, either with or without the assistance of an internal combustion engine.

The vehicle 10 of FIG. 1 is schematically illustrated as a sport utility vehicle (SUV). However, the teachings of this disclosure may be applicable to any style of vehicle, including but not limited to, cars, trucks, vans, SUVs, etc.

The vehicle 10 may include a charge port housing assembly 14 configured for charging the energy storage devices (e.g., battery cells of a traction battery pack) of the vehicle 10. The charge port housing assembly 14 may include a door assembly 16 movably mounted relative to a vehicle body component 18. In an embodiment, the vehicle body component 18 is a rear quarter panel of the vehicle 10. However, the charge port housing assembly 14 could be arranged elsewhere on the vehicle 10, such as within a front fender 19 of the vehicle 10, for example. Further, while a charge port door assembly 16 is illustrated in this embodiment, a similar door assembly could be utilized for other types of vehicle assemblies, such as a fuel fill housing assembly (see, e.g., the embodiment of FIG. 11), for example.

The door assembly 16 may include a charge port door 22 and a hinge arm 24 (see FIG. 2) that is connected to the charge port door 22. The hinge arm 24 pivotably connects the charge port door 22 relative to the vehicle body component 18 for movement between closed and open positions. The door assembly 16 is shown in the closed position in FIG. 1 and in the open position in FIG. 2. In the closed position, the door assembly 16 covers one or more charge ports 20 of the charge port housing assembly 14. The charge port 20 may be mounted within a housing 26 of the charge port housing assembly 14, and the housing 26 may be mounted relative to the vehicle body component 18.

Figure 2:
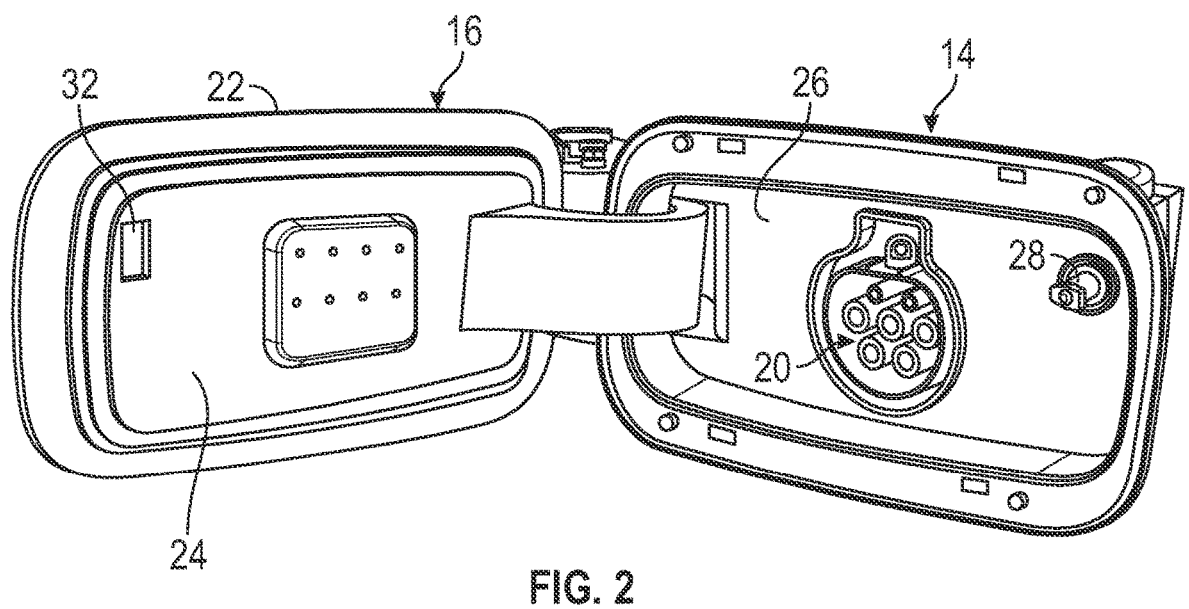
FIG. 2 is a blown-up view of the charge port housing assembly of the vehicle of FIG. 1.

When charging the vehicle 10 from an external power source is desired, the door assembly 16 can be moved from the closed position shown in FIG. 1 to the open position shown in FIG. 2. A user can then couple a charger to the charge port 20 of the charge port housing assembly 14 so that power from the external power source can be provided for charging the energy storage devices of the vehicle 10. The charge port 20 may be configured to receive AC power, DC power, or both from the external power source.

Referring now primarily to FIGS. 2, 3A, 3B, 4A, and 4B, the charge port housing assembly 14 may additionally include a latching assembly 28 adapted for locking the door assembly 16 when it is moved to the closed position. The latching assembly 28 may be positioned within the housing 26 of the charge port housing assembly 14, such as at a location that is generally at an opposite side of the housing 26 from the location where the hinge arm 24 interfaces with the housing 26. However, the specific location at which the latching assembly 28 is arranged relative to the housing 26 is not intended to limit this disclosure.

The latching assembly 28 may be configured to permit locking of the door assembly 16 during normal operating conditions (i.e., during normal use). For example, the vehicle owner may wish to lock the door assembly 16 to secure the charge port housing assembly 14 from tampering.

The latching assembly 28 may include a T-bar 30 that interfaces with an opening 32 formed in the hinge arm 24. The T-bar 30 may be received through the opening 32 and into a space formed between the charge port door 22 and the hinge arm 24 for locking the door assembly 16.

Figure 3A:
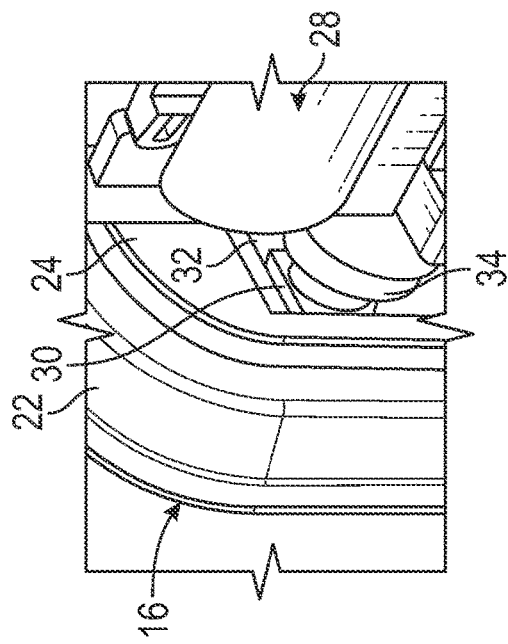
FIGS. 3A and 3B illustrate an unlocked position of a door assembly of the charge port housing assembly of FIGS. 1 and 2.
Figure 3B:
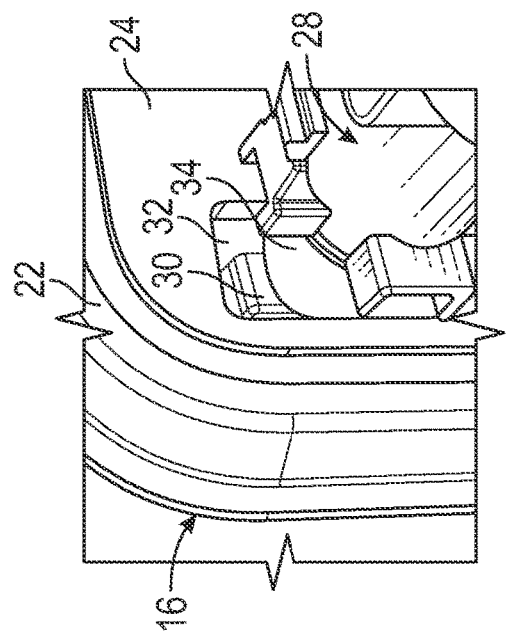

The latching assembly 28 is shown in an unlocked position in FIGS. 3A and 3B. In this position, the T-bar 30 is oriented in a position that is substantially aligned with a longitudinal axis A of the opening 32, and thus, the door assembly 16 is free to move relative to the latching assembly 28.

Figure 4A:
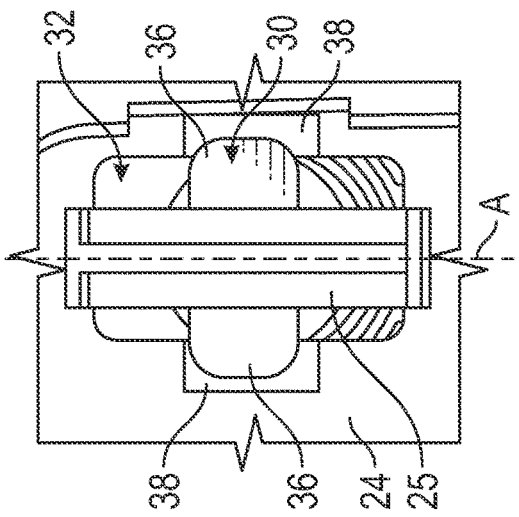
FIGS. 4A and 4B illustrate a locked position of the door assembly of the charge port housing assembly of FIGS. 1 and 2.
Figure 4B:
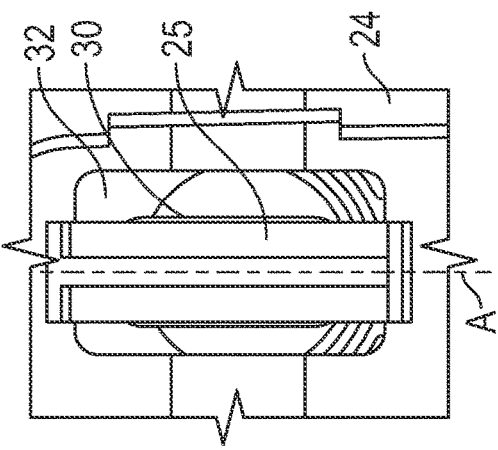

The latching assembly 28 is shown in a locked position in FIGS. 4A and 4B. This position may occur when the charge port door 22 is pushed closed. The charge port door 22 pushes against a vertical bar 25 arranged within the space between the charge port door 22 and the hinge arm 24 as the charge port door 22 is pushed toward the closed position. As the charge port door 22 is pushed, the vertical bar 25 contacts the T-bar 30, thereby causing the T-bar 30 to move linearly relative to a barrel 34 of the latching assembly 28 and then rotate about 90°. Upon rotating, the T-bar 30 is oriented in a position that is transverse relative to the longitudinal axis A of the opening 32. In the rotated position, outer ear portions 36 of the T-bar 30 may engage tabs 38 of the hinge arm 24 to prevent the T-bar 30 from moving back through the opening 32, thereby locking the door assembly 16. To unlock the door assembly 16, the charge port door 22 may be pushed again, thus triggering an opposite sequence in which the T-bar 30 rotates back to the position shown in FIGS. 3A and 3B.

The door assembly 16 of the charge port housing assembly 14 may undesirably become held in the closed position. For instance, the latching assembly 28 may be malfunctioning. Further, the latching assembly 28 may hold the door assembly 16 closed during fuel tank pressurization sequences such as those commonly used on HEVs. The user may confuse this with a malfunctioning latch and/or door assembly, and thus the user may attempt to pry open the door assembly 16.

Figure 5:
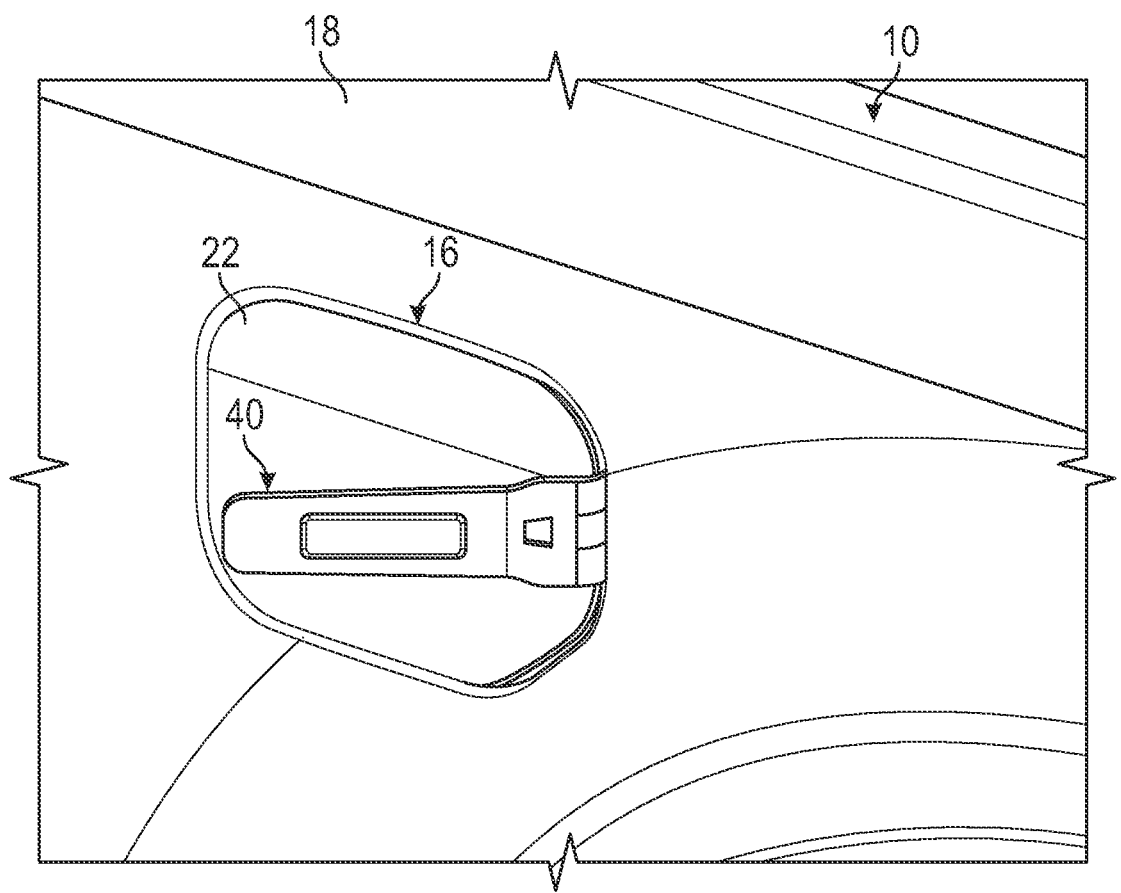
FIG. 5 schematically illustrates the use of a pry tool for manually opening a door assembly of a charge port housing assembly.

Regardless of the specific circumstances, a user may use a tool 40 (see, e.g., FIG. 5) to pry open the door assembly 16. Specifically, the user may use the tool 40 to apply a manual override force of sufficient magnitude to separate the door assembly 16 from the latching assembly 28. The tool 40 could be a known tool, such as a flathead screwdriver, for example, or could be a particular tool, such as that disclosed within US Patent Publication No. 2020/0346541, assigned to Ford Global Technologies, LLC, for example. The specific design of the tool 40 is not intended to limit this disclosure.

Figure 6:
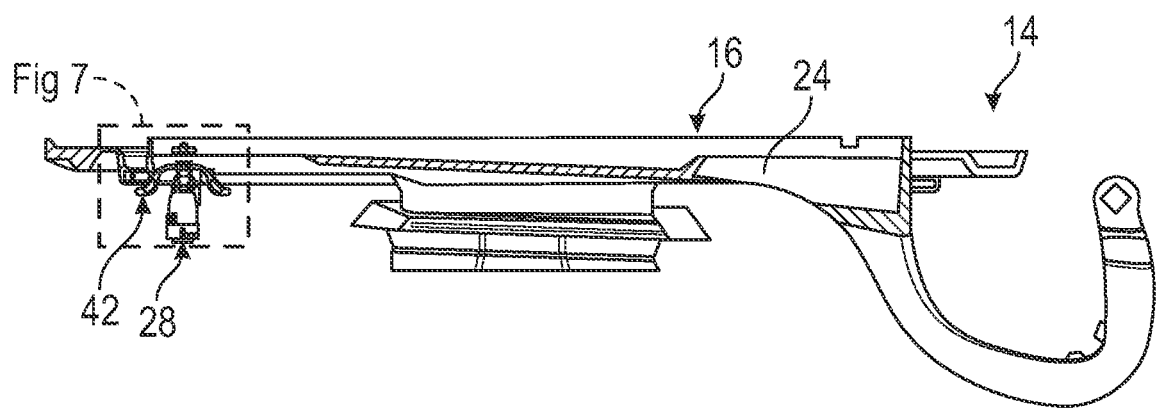
FIG. 6 illustrates an exemplary door assembly of a charge port housing assembly.
Figure 7:
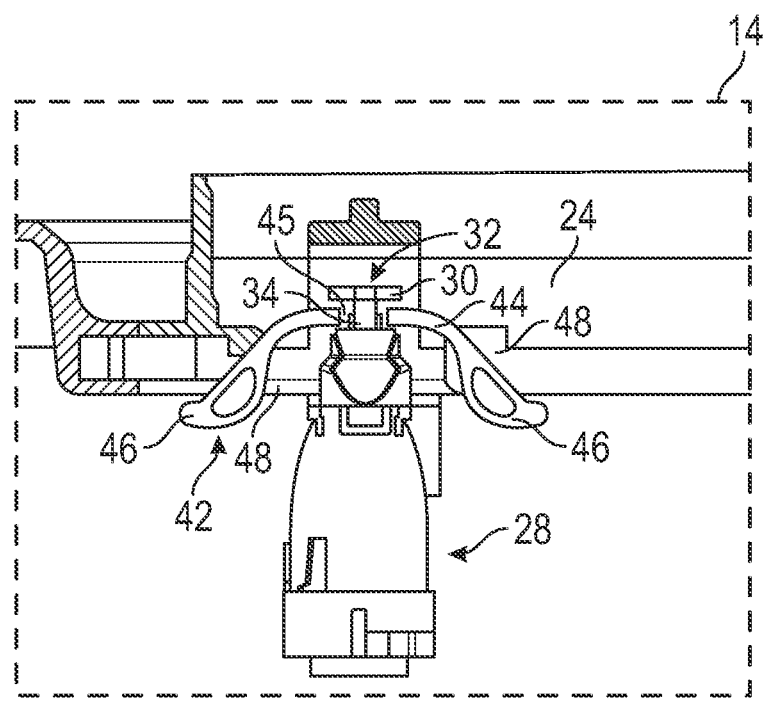
FIG. 7 is a blown-up view of portions of the door assembly of FIG. 6.

FIGS. 6 and 7 illustrate an exemplary override retainer 42 that may be incorporated as part of the charge port housing assembly 14. The override retainer 42 is configured to provide for the manual release of the door assembly 16 when a manual override force is applied thereto.

The override retainer 42 may be secured relative to the hinge arm 24 of the door assembly 16. In an embodiment, the override retainer 42 is attached directly to the hinge arm 24 in the vicinity of the opening 32. In another embodiment, the override retainer 42 is integrally molded into the hinge arm 24 at the location of the opening 32. The override retainer 42 may be mounted/molded at any location that is sufficient to interface with the T-bar 30 of the latching assembly 28.

The hinge arm 24 and the override retainer 42 may be injection molded utilizing a two-shot injection molding process. A first shot of material (i.e., the hard shot) provides the hinge arm 24. A second shot of material (i.e., the soft shot) provides the override retainer 42. The two-shot process facilitates incorporating the override retainer 42 within the hinge arm 24 during the molding process.

The override retainer 42 may include a central ring 44 and two more flexible retaining flaps 46 that extend outwardly from the central ring 44. The central ring 44 circumscribes a central opening 45 and may be received about the barrel 34 of the latching assembly 28. Each of the flexible retaining flaps 46 may extend along a curved path and may engage surfaces 48 of the hinge arm 24 that are located adjacent to the latching assembly 28.

The override retainer 42 may be constructed from a flexible material to allow it to flex, deflect, distort, etc. Exemplary materials include rubber, polypropylene, and glass reinforced thermoset polyester sheet materials. However, other flexible materials are also contemplated within the scope of this disclosure. The geometry and material durometer of the override retainer 42 may be tuned to achieve a desired level of flexibility within the flexible retaining flaps 46 of the override retainer 42.

The override retainer 42, and in particular the flexible retaining flaps 46, are configured to deflect or otherwise distort when a threshold amount of a manual override force is applied to the door assembly 16. As the flexible retaining flaps 46 distort, the T-bar 30 of the latching assembly 28 can slip through the central opening 45, thereby releasing the latching assembly 28 from the door assembly 16 and permitting the door assembly 16 to swing open.

The flexibility of the override retainer 42 may further allow for the T-bar 30 to pass back through the central opening 45 when the door assembly 16 is subsequently closed again. The override retainer 42 is thus reusable for multiple door opening/closing cycles.

Figure 8:
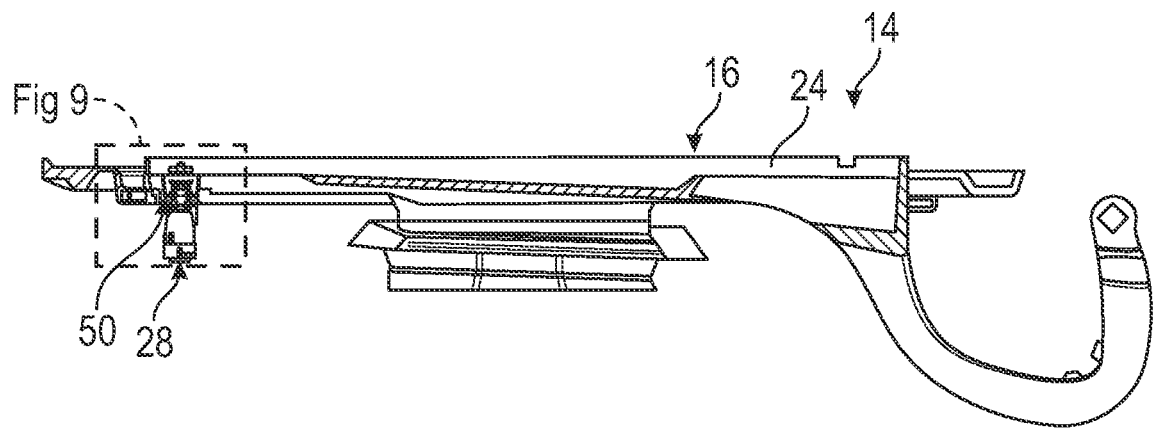
FIG. 8 illustrates another exemplary door assembly of a charge port housing assembly.
Figure 9:
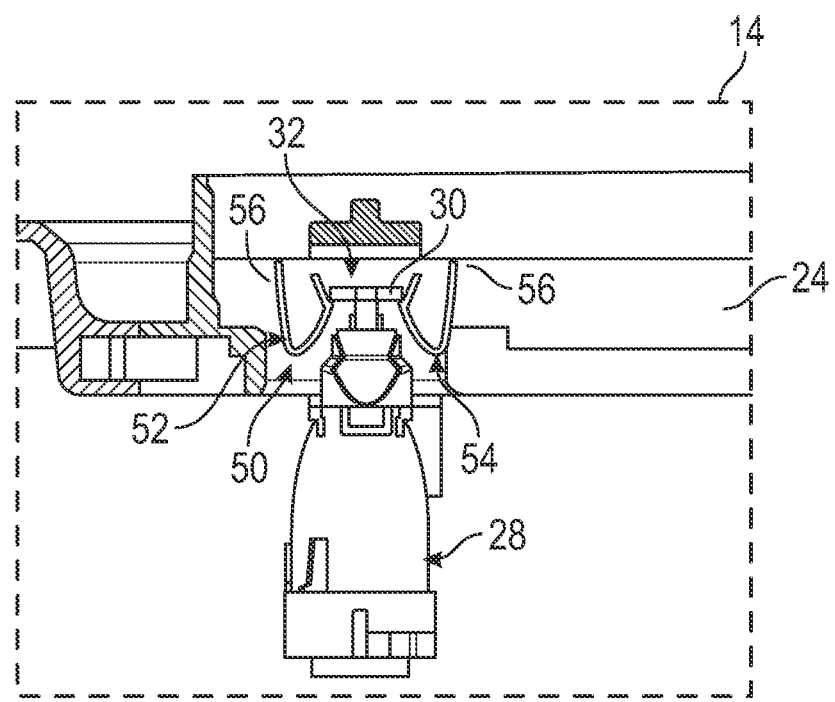
FIG. 9 is a blown-up view of the door assembly of FIG. 8.
Figure 10:
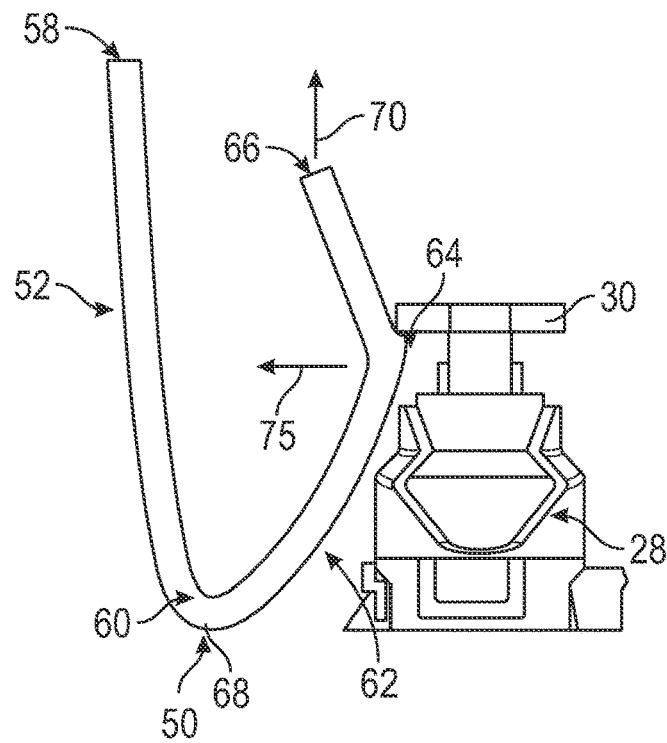
FIG. 10 illustrates a retaining clip of the door assembly of FIGS. 8-9.

FIGS. 8, 9, and 10 illustrate another exemplary override retainer 50 that may be incorporated as part of the charge port housing assembly 14. The override retainer 50 embodies a different design than the override retainer 42 discussed above. Like the override retainer 42, the override retainer 50 is configured to allow for the manual release of the door assembly 16 when a manual override force of a sufficient threshold is applied thereto.

The override retainer 50 may be secured relative to the hinge arm 24 of the door assembly 16. In an embodiment, the override retainer 50 is attached directly to the hinge arm 24 in the vicinity of the opening 32. In another embodiment, the override retainer 50 is integrally molded into the hinge arm 24 at the location of the opening 32. The override retainer 50 may be mounted/molded at any location that is sufficient to interface with the T-bar 30 of the latching assembly 28.

The hinge arm 24 and the override retainer 50 may be injection molded utilizing a two-shot injection molding process. A first shot of material (i.e., the first hard shot) provides the hinge arm 24. A second shot of material (i.e., the second hard shot) provides the override retainer 50. The two-shot process facilitates incorporating the override retainer 50 within the hinge arm 24 during the molding process The override retainer 50 may include a first retention clip 52 and a second retention clip 54. The first and second retention clips 52, 54 may be arranged on opposite sides of the latching assembly 28 and are configured to interface with the T-bar 30. Each retention clip 52, 54 may include a U-shape or V-shape and may engage surfaces 56 of the hinge arm 24.

Each retention clip 52, 54 may be constructed from a hard shot plastic material. The material make-up of the retention clips 52, 54 may be specifically tuned to provide a desired level of flexibility when deflected or otherwise distorted. In an embodiment, the retention clip 52 is made from the same material as the hinge arm 24.

The first retention clip 52 of the override retainer 50 is further illustrated with reference to FIG. 10. It should be understood that the second retention clip 54 would include a substantially identical design to that of the first retention clip 52.

The first retention clip 52 may include an attachment portion 58, a deflection portion 60, a re-engagement portion 62, a shelf portion 64, and a free end portion 66. The attachment portion 58 may be secured to or integrally molded within the surface 56 of the hinge arm 24. The deflection portion 60 may be connected to the attachment portion 58 and establishes a deflection point 68 of the first retention clip 52. The re-engagement portion 62 may connect to the deflection portion 60 and may extend at an angle between the deflection portion 60 and the shelf portion 64. The shelf portion 64 may be located at an opposite end of the re-engagement portion 62 from the deflection portion 60. The free end portion 66 may extend away from the shelf portion 64 and is capable of swinging freely relative to the hinge arm 24.

When a manual override force of a sufficient magnitude is applied to the door assembly 16, the free end portion 66 of each retention clip 52, 54 may move in a direction of arrow 70 (i.e., toward the charge port door 22), thereby resulting in some deflection occurring at the deflection point 68 of the deflection portion 60. The deflection results in displacement of the shelf portion 64 in a direction of arrow 75 (i.e., away from the T-bar 30), thereby releasing the latching assembly 28 from the door assembly 16 and permitting the door assembly 16 to swing open.

When the door assembly 16 is subsequently pushed closed again, the T-bar 30 may engage the re-engagement portion 62 of each retention clip 52, 54 for guiding the retention clips 52, 54 back into place. As the T-bar 30 engages the re-engagement portion 62, deflection occurs at the deflection point 68 of the deflection portion 60. The deflection allows the shelf portion 64 to reposition itself for reengaging the T-bar 30 and permit the door assembly 16 to properly close. The override retainer 50 is thus reusable for multiple door opening/closing cycles.

Figure 11:
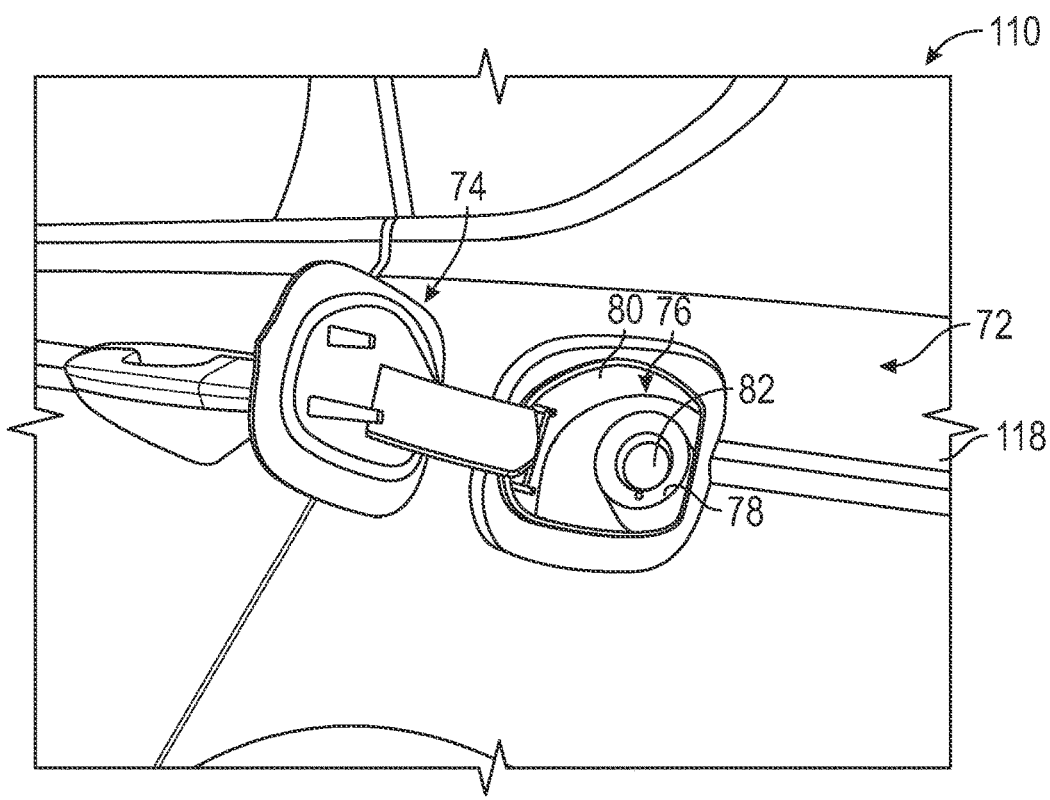
FIG. 11 illustrates select portions of a vehicle equipped with a fuel fill housing assembly.

FIG. 11 illustrates select portions of another vehicle 110. The vehicle 110 could be a car, a truck, a van, a SUV, or any other type of vehicle. The vehicle 110 could also be a conventional, internal combustion engine powered vehicle, a traction battery powered hybrid electric vehicle (HEV), a plug-in hybrid electric vehicle (PHEV), etc.

The vehicle 110 includes a fuel fill housing assembly 72 for delivering fuel to a fuel tank (not shown) that stores fuel (e.g., gasoline, diesel, etc.) that is necessary for powering a power source (e.g., internal combustion engine) of the vehicle 110. The fuel fill housing assembly 72 may include a door assembly 74 movably mounted relative to a vehicle body component 118 (e.g., quarter panel, fender, etc.). The door assembly 74 is substantially similar to the door assembly 16 of the charge port housing assembly discussed above.

The door assembly 74 is movable between open and closed positions to selectively expose and cover a fuel compartment 76. A fuel inlet conduit 78 connected to the fuel tank of the vehicle 110 is located in the fuel compartment 76. A housing 80 may extend between the fuel inlet conduit 78 and the vehicle body component 118 to cover a gap therebetween. To refuel the vehicle 110, a fuel dispensing nozzle of a fuel pump (not shown) may be inserted through an inlet opening 82 of the fuel inlet conduit 78.

The fuel fill housing assembly 72 of FIG. 11 may include a latching assembly substantially similar to the latching assembly 28 of the charge port housing assembly 14 shown in FIGS. 2-4B. The door assembly 74 may thus be locked when moved to the closed position.

The fuel fill housing assembly 72 may additionally include an override retainer substantially similar to either the override retainer 42 of FIGS. 6-7 or the override retainer 50 of FIGS. 8-10. The door assembly 74 of the fuel fill housing assembly 72 may thus be manually opened even in the event of a malfunction.

The vehicle assemblies of this disclosure employ override retainers for manually releasing a movable door assembly when a manual override force is applied thereto. The proposed assemblies therefore provide for backup operation of the movable door assembly even in the event of a malfunction. The proposed assemblies further avoid the need for relatively expensive pull cable systems for manually releasing the movable door assembly.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle assembly, comprising:
 a door assembly configured to move between a closed position and an open position;
 a latching assembly configured to selectively lock the door assembly in the closed position; and
 an override retainer configured to deflect to release the latching assembly from the door assembly when a manual override force is applied to the door assembly, wherein the manual override force is applied to the door assembly by a tool in response to a malfunction of the latching assembly,
 wherein the override retainer includes a central ring and a pair of flexible retaining flaps that extend outwardly from the central ring,
 wherein the override retainer is integrally molded together with a hinge arm of the door assembly.

2. The vehicle assembly as recited in claim 1, wherein the door assembly includes a fuel door or a charge port door.

3. The vehicle assembly as recited in claim 1, wherein the central ring is received about a barrel of the latching assembly, and further wherein the flexible retaining flaps engage surfaces of the hinge arm of the door assembly that are located adjacent to the latching assembly.

4. The vehicle assembly as recited in claim 1, wherein the pair of flexible retaining flaps are configured to deflect to release the latching assembly from the door assembly when the manual override force is applied.

5. The vehicle assembly as recited in claim 1, wherein the latching assembly includes a T-bar movable between a first position and a second position, wherein the second position is transverse to the first position.

6. A vehicle comprising the vehicle assembly of claim 1, wherein the vehicle includes a vehicle body component and the door assembly is movable relative to the vehicle body component when moved between the closed position and the open position.

7. The vehicle as recited in claim 6, wherein the vehicle body component is a quarter panel or a fender.

8. The vehicle assembly as recited in claim 1, wherein the pair of flexible retaining flaps includes a first flexible retaining flap that extends from a first side of the central ring and a second flexible retaining flap that extends from a second, opposite side of the central ring.

9. The vehicle assembly as recited in claim 1, wherein each flexible retaining flap of the pair of flexible retaining flaps extends along a curved path between a proximal portion that connects to the central ring and a distal portion that is displaced from the central ring.

10. The vehicle assembly as recited in claim 9, wherein the distal portions is positioned farther from the door assembly than the central rings.

11. The vehicle assembly as recited in claim 1, wherein each flexible retaining flap of the pair of flexible retaining flaps is lobe shaped.

12. A method, comprising:
 deflecting an override retainer to release a latching assembly from a door assembly of a vehicle charge port housing assembly or a vehicle fuel fill housing assembly during a manual override event in which a manual override force is applied to the door assembly, wherein deflecting the override retainer includes allowing a T-bar of the latching assembly to be displaced from the override retainer, wherein the manual override force is provided by a pry tool that is a separate and distinct component from any portion of the vehicle charge port housing assembly or the vehicle fuel fill housing assembly.

13. The method as recited in claim 12, wherein the override retainer is integrally molded together with a hinge arm of the door assembly.

14. The method as recited in claim 13, wherein the override retainer is molded together with the hinge arm as part of a two-shot injection molding process.

15. The method as recited in claim 12, wherein deflecting the override retainer includes:

distorting a flexible retaining flap of the override retainer.

16. The method as recited in claim 12, wherein the override retainer is configured to allow a portion of the latching assembly to pass back through the override retainer when the door assembly is closed subsequent to the manual override event, thereby reengaging the override retainer and thus the door assembly relative to the latching assembly.

17. A vehicle assembly, comprising:

a door assembly configured to move between a closed position and an open position, wherein the door assembly includes a door and a hinge arm connected to the door;

a latching assembly configured to selectively lock the door assembly in the closed position, wherein the latching assembly includes a T-bar configured to interface with an opening of the hinge arm; and an override retainer including a central ring, a first flexible retaining flap that that-protrudes away from the central ring, and a second flexible retaining flap that extends away from the central ring, wherein the first flexible retaining flap and the second flexible retaining flap are each lobe shaped, wherein the first flexible retaining flap and the second flexible retaining flap are configured to deflect to displace the T-bar of the latching assembly from the override retainer and thus release the latching assembly from the door assembly when a manual override force is applied to the door assembly.

* * * * *